Patented Feb. 17, 1948

2,436,141

UNITED STATES PATENT OFFICE 2,436,141

DIALKYL ESTERS OF LONG-CHAIN ALKYLPHOSPHONATES

Max T. Goebel, Rocky River, Ohio, assignor to E. I. du Pont de Nemours & Company, Wilmington, Del., a corporation of Delaware No Drawing. Application March 7, 1946, Serial No. 652,788

1 Claim. (Cl. 260—461)

This invention relates to new compositions of matter containing phosphorus. More particularly this invention relates to dialkyl esters of long-chain alkyl-phosphonates and methods for their preparation.

An object of this invention is to provide new compositions of matter. A further object is to provide novel dialkyl esters of long-chain alkyl-phosphonates and methods for their preparation.

These objects are accomplished by preparing new dialkyl esters of long-chain alkylphosphonates having the formula:

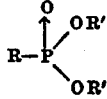

where R is a normal alkyl, i. e., saturated straight-chain aliphatic hydrocarbon radical of eight to eighteen carbon atoms and R' is a lower alkyl radical of one to four carbon atoms.

The compounds of this invention can be prepared by reacting a long-chain (eight-eighteen carbon atoms) n-alkyl chloride with a lower trialkyl phosphite under conditions of elevated temperature and under superatmospheric pressure. The product is then isolated by vacuum distillation.

This invention is further illustrated by the following example, in which parts are by weight, unless otherwise specified.

Example

A mixture of 46.4 parts of triethyl phosphite and 63.0 parts of dodecyl chloride (laurylchloride) were heated in a sealed reaction vessel at 210° C. for 6 hours. The reaction mixture was then subjected to vacuum distillation and 20.5 parts of diethyl dodecylphosphonate boiling at 164–165° C./1.2 mm. was obtained. This product had a refractive index of 1.4389 at 25° C.

Analysis: Calculated for $C_{16}H_{35}O_3P$: C, 62.60; H, 11.45. Found: C, 62.13; H, 11.74.

Other saturated n-alkyl halides which are useful in forming the compounds of this invention are n-octyl chloride, n-decyl chloride, n-tetradecyl chloride, n-hexadecyl chloride, n-octadecyl chloride. The bromides and iodides can also be used.

Other trialkyl phosphites which can be used in preparing the compounds of this invention are tri-methyl phosphite, tri-propyl phosphite and tri-butyl phosphite.

In addition to the diethyl dodecylphosphonate of the example other dialkyl esters of saturated long-chain alkylphosphonates are diethyl decylphosphonate, diethyl octadecylphosphonate, dipropyl dodecylphosphonate, dibutyl dodecylphosphonate, and dibutyl hexadecylphosphonate.

The compounds of this invention can also be prepared from the long-chain n-alkyl halides and the sodium dialkyl phosphites, for example sodium dibutyl phosphite and lower dialkyl sodium phosphites.

The compounds of this invention are useful as extreme pressure lubricant additives, insecticides and surface-active agents.

As many apparently widely different embodiments of this invention may be made without departing from the spirit and scope thereof, it is to be understood that I do not limit myself to the specific embodiments thereof except as defined in the appended claim.

I claim:

The chemical compound diethyl dodecylphosphonate.

MAX T. GOEBEL.

REFERENCES CITED

The following references are of record in the file of this patent:

UNITED STATES PATENTS

| Number | Name | Date |
| --- | --- | --- |
| 2,365,466 | Hamilton | Dec. 19, 1944 |
| 2,397,422 | Kosolapoff | Mar. 26, 1946 |

OTHER REFERENCES

Beilstein, "Handbuch der Org. Chem.," 4th ed., vol. IV, page 596.

Beilstein, "Handbuch der Org. Chem.," 4th ed., supplemental vol. III/IV, page 573.

Arbuzov, "Chem. Abstracts," vol. 25, page 2414 (1931).

Chemical Industries, vol. 55, page 581 (Oct. 1944).

Kosolapoff, "Jour. Am. Chem. Soc.," vol. 66, pages 109–111 (1944).

Kosolapoff, "Jour. Am. Chem. Soc.," vol. 67, pages 1180 to 1182, 2259 to 2260 (1945).